United States Patent
Ferrand et al.

(10) Patent No.: US 12,540,577 B2
(45) Date of Patent: Feb. 3, 2026

(54) AIRCRAFT PROPULSION SYSTEM WITH START-UP CONTROL DEVICE

(71) Applicants: SAFRAN, Paris (FR); SAFRAN HELICOPTER ENGINES, Bordes (FR)

(72) Inventors: Antoine Pierre Emmanuel Ferrand, Moissy-Cramayel (FR); Fabien Mercier-Calvairac, Moissy-Cramayel (FR)

(73) Assignees: SAFRAN, Paris (FR); Safran Helicopter Engines, Bordes (FR)

( * ) Notice: Subject to any disclaimer, the term of this patent is extended or adjusted under 35 U.S.C. 154(b) by 0 days.

(21) Appl. No.: 18/569,336

(22) PCT Filed: Jun. 9, 2022

(86) PCT No.: PCT/FR2022/051103
§ 371 (c)(1),
(2) Date: Dec. 12, 2023

(87) PCT Pub. No.: WO2022/263750
PCT Pub. Date: Dec. 22, 2022

(65) Prior Publication Data
US 2024/0263584 A1  Aug. 8, 2024

(30) Foreign Application Priority Data
Jun. 18, 2021 (FR) .................................. 2106471

(51) Int. Cl.
*F02C 7/268* (2006.01)
*B64D 33/00* (2006.01)
*F02C 7/264* (2006.01)

(52) U.S. Cl.
CPC .............. *F02C 7/268* (2013.01); *B64D 33/00* (2013.01); *F02C 7/264* (2013.01); *F05D 2260/85* (2013.01)

(58) Field of Classification Search
CPC .. F02C 7/26; F02C 7/264; F02C 7/266; F02C 7/268
See application file for complete search history.

(56) References Cited

U.S. PATENT DOCUMENTS

| 2011/0146291 A1* | 6/2011 | Snider ..................... F01D 19/00 60/778 |
| 2014/0075952 A1* | 3/2014 | Djelassi ................... F02C 7/26 60/772 |
| 2016/0305329 A1* | 10/2016 | Saito ....................... F02C 7/264 |

FOREIGN PATENT DOCUMENTS

| EP | 2 006 496 A1 | 12/2008 |
| FR | 2 995 345 A1 | 3/2014 |

(Continued)

OTHER PUBLICATIONS

International Search Report mailed Sep. 30, 2022, issued in corresponding International Application No. PCT/FR2022/051103, filed Jun. 9, 2022, 6 pages.

(Continued)

*Primary Examiner* — Gerald L Sung
(74) *Attorney, Agent, or Firm* — CHRISTENSEN O'CONNOR JOHNSON KINDNESS PLLC

(57) ABSTRACT

A propulsion system includes a gas turbine designed so that a combustion chamber can be ignited in a first ignition range of rotational speeds of a compressor shaft. The system further includes a control device designed to control an electric starter to accelerate the compressor shaft and, when the compressor shaft is accelerated, to control an attempt to ignite the combustion chamber. The gas turbine is designed so that the combustion chamber can be ignited in a second (Continued)

ignition range which is higher than the first ignition range, but not between these two ignition ranges, and the ignition attempt is carried out in the second ignition range.

12 Claims, 6 Drawing Sheets

(56) References Cited

FOREIGN PATENT DOCUMENTS

| | | |
|---|---|---|
| WO | 2013/007912 A1 | 1/2013 |
| WO | 2014/037649 A1 | 3/2014 |

OTHER PUBLICATIONS

Written Opinion mailed Sep. 30, 2022, issued in corresponding International Application No. PCT/FR2022/051103, filed Jun. 9, 2022, 6 pages.

* cited by examiner

AIRCRAFT PROPULSION SYSTEM WITH START-UP CONTROL DEVICE

FIELD OF THE DISCLOSURE

This disclosure relates to an aircraft propulsion system and method, and to a computer program for implementing the method.

BACKGROUND

The document FR 2 995 345 A1 describes an aircraft gas turbine comprising a combustion chamber, a compressor shaft for supplying compressed air to the combustion chamber and a starter connected to the shaft so as to provide it with sufficient starting torque to drive it in rotation. The document also describes the starting phases required to start-up the gas turbine, which comprise a phase referred to as pre-acceleration phase during which the starter is activated to drive the shaft in rotation, followed by a phase referred to as stabilisation phase during which the rotational speed of the shaft is maintained at a speed bearing. This stabilisation phase corresponds to a delay during which the various ignition equipment for igniting the combustion chamber are activated ready for use. These phases take place when the compressor shaft is rotating at low regime, i.e. with a low rotational speed. Once the rotational speed of the shaft has stabilised, an attempt is carried out to ignite the combustion chamber using the activated ignition equipment. If ignition is successful, the shaft is accelerated to reach a high regime, i.e. high rotational speeds.

The prior art also comprises the documents WO 2013/007912 A1 and EP 2 006 496 A1, which describe methods for starting an aircraft gas turbine engine.

The disclosure proposes an improvement to these technologies, which in particular allows to supplement the start-up strategy of a gas turbine by proposing a propulsion system that improves the start-up time and chances.

SUMMARY

An aircraft propulsion system is therefore proposed, comprising:
  a gas turbine comprising: a combustion chamber, an ignition device for igniting the combustion chamber, a compressor for supplying air to the combustion chamber, the compressor being equipped with a compressor shaft, and an electric starter for driving the compressor shaft, the gas turbine being designed so that the combustion chamber can be ignited by the ignition device in a first ignition range of rotational speeds of the compressor shaft;
  a start-up control device designed to: with the combustion chamber switched off, control the electric starter to accelerate the compressor shaft, and with the compressor shaft accelerated, control the ignition device to attempt an ignition of the combustion chamber;
  characterised in that the gas turbine is designed in such a way that the combustion chamber can additionally be ignited by the ignition device in a second ignition range of rotational speeds of the compressor shaft which is greater than the first ignition range, but not between these two ignition ranges, the control device being designed, when the compressor shaft is accelerated, to accelerate the latter up to the second ignition range in order to attempt to ignite the combustion chamber in the latter.

Thus, thanks to the disclosure, the start-up time can be reduced, as there is no need for a stabilisation phase, or delay in the rotational speed. During the acceleration phase up to high regimes, with the combustion chamber switched off, the various ignition equipment, such as the ignition device or one or more fuel injectors, can be activated so that they are ready for use when the second ignition range is reached. Thanks to the disclosure, the reliability and the reproducibility of the start-up is also improved, with operability problems such as the risk of over-temperature being eliminated.

The system according to the disclosure may comprise one or more of the characteristics below, taken alone with each other or in combination with each other:
  the second ignition range has a lower bound at least equal to 40% of a nominal rotational speed of the compressor shaft;
  the first ignition range has an upper bound of at most 30% of the nominal rotational speed of the compressor shaft;
  the control device is designed, if the ignition attempt fails, to:
    decelerate the compressor shaft until the first ignition range is reached; and
    with the rotational speed in the first range, control the ignition device to attempt an ignition of the combustion chamber;
  the control device is arranged to control the electric starter and the ignition device in response to extinguishing the combustion chamber and detecting that the rotational speed falls below the second ignition range;
  the control device is configured to determine a lower bound of the second ignition range from at least one atmospheric environment parameter of the gas turbine.

The disclosure also relates to an aircraft comprising a propulsion system according to the disclosure.

The disclosure also relates to a method for starting up a gas turbine of an aircraft, comprising:
  while a combustion chamber of the gas turbine is switched off, controlling an electric starter of the gas turbine to accelerate a compressor shaft driving a compressor supplying air to the combustion chamber; and
  with the compressor shaft accelerated, the control of an ignition device of the gas turbine to attempt an ignition of the combustion chamber;
  characterised in that, the gas turbine being designed so that the combustion chamber can be ignited by the ignition device in a first ignition range and in a second ignition range of rotational speeds of the compressor shaft, the second ignition range being greater than the first ignition range but not between these two ignition ranges, the compressor shaft is accelerated up to the second ignition range in order to attempt the ignition of the combustion chamber in the latter.

The method according to the disclosure may comprise the following characteristic:
  a lower bound of the second ignition range is determined beforehand by testing the gas turbine or by simulating the gas turbine.

The disclosure also relates to a computer program that can be downloaded from a communications network and/or recorded on a computer-readable medium, characterised in that it comprises instructions for executing a start-up method according to the disclosure, when the computer program is executed on a computer.

DESCRIPTION OF THE DRAWINGS

The disclosure will be better understood with the aid of the following description, given only by way of example and made with reference to the attached drawings in which.

DETAILED DESCRIPTION

Figure 1:
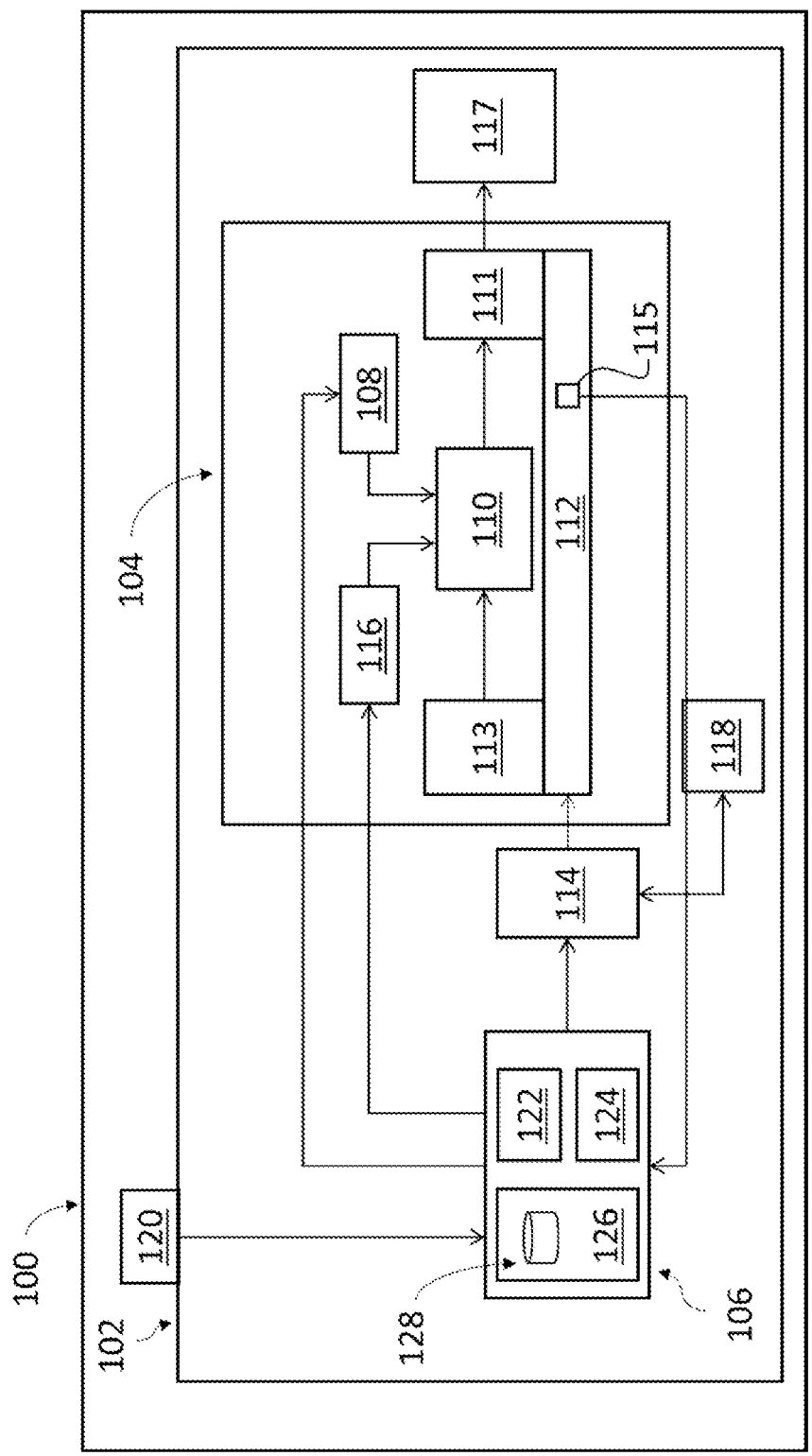
FIG. 1 is a very schematic view of an aircraft propulsion system with its start-up control device, according to the disclosure.

FIG. 1 illustrates an example of a propulsion system 100 for an aircraft according to the disclosure, comprising a gas turbine 102 and a control device 106 for starting the gas turbine 102.

The gas turbine 102 comprises a gas generator 104 comprising a combustion chamber 110 and a fuel injector 116 for injecting fuel into the combustion chamber 110. In the latter, pressurised air is intended to be introduced to mix with the fuel to carry out a combustion. The gas generator 104 also comprises an ignition device 108 for igniting the combustion chamber 110 designed to initiate combustion.

In order to raise the pressure of the air intended to be introduced into the combustion chamber 110, the gas generator 104 also comprises a compressor 113 designed to supply pressurised air to the combustion chamber 110.

To drive the compressor 113, the gas generator 104 also comprises a turbine 111 and a mechanical shaft, referred to as the compressor shaft 112, connecting the compressor 113 to the turbine 111. The turbine 111 is designed to be driven in rotation by the gases resulting from the combustion in the combustion chamber 110 and thus to drive in rotation the compressor shaft 112 at a rotational speed $N_{GG}$. The compressor 113 is thus driven by the compressor shaft 112.

The propulsion system 100 comprises a sensor 115 for measuring this rotational speed $N_{GG}$, for example.

The surplus of thermal energy generated at the outlet of the gas generator 104 can be recovered by a member 117 of the propulsion system 100. This member 117 may be a nozzle for the thrust generation, a free or linked turbine for generating mechanical energy to drive a rotor or a propeller, or an electrical generator.

On start-up, the thermal energy leaving the combustion chamber 110 is insufficient to drive the turbine 111 with the compressor shaft 112. To compensate for this, the gas turbine 102 also comprises an electric machine 114 (for example reversible) which can be controlled in motor mode to drive the compressor shaft 112, the electric machine 114 then having a starter function. In the following, the electric machine 114 is referred to as the electric starter 114.

The electric starter 114 is connected to the compressor shaft 112 and allows to provide a torque to the compressor shaft 112 to drive it in rotation. The assistance provided by the electric starter 114 also allows to overcome all the resistive torques of the rotating portions.

When reversible, the electric machine 114 can also have an alternator mode in which it can take torque from the compressor shaft 112 and thus become an electric generator.

To supply the electric starter 114 with electricity, the gas turbine 102 comprises, for example, an electrical storage device 118 connected to the electric starter 114. The electrical storage device 118, for example one or more batteries, is designed to deliver high powers to allow the electric starter 114 to drive the compressor shaft 112 in rotation. The storage device 118 can be recharged by the electric starter 114 when it is in alternator mode.

The storage device 118 can be configured to deliver a power that can reach between 1 and 15% of a total power delivered by the gas turbine 102 when the latter is at 100% of its nominal speed (in standard atmospheric conditions on the ground), and advantageously between 5 and 11% of this total power.

The propulsion system 100 further comprises a measurement system 120 designed to measure one or more parameters of the atmospheric environment of the gas turbine 102 and to provide the measurements to the control device 106.

The control device 106 is designed, for example, to receive measurements from the measurement system 120 and from the rotational speed sensor 115 of the compressor shaft 112.

In the example described, the control device 106 comprises a computer system comprising a data processing unit 122 (such as a microprocessor) and a main memory 124 accessible by the processing unit 122. This computer system also comprises a computer program 128 containing instructions for the processing unit 122. This computer program 128 is, for example, intended to be loaded into the main memory 124, either all at once or in parts, so that the processing unit 122 can execute its instructions.

Before being loaded into the main memory 124, the computer program 128 is, for example, stored on a support 126 adapted for this purpose (such as a local mass storage device like a hard disk) and/or downloaded via a network interface of the computer system.

For example, this computer system is an on-board calculator of the ECU type (Electronic Control Unit).

The instructions of the computer program 128 are designed so that, when executed by the data processing unit 122, the control device 106 carries out the steps which will be described later.

Alternatively, all or some of these steps can be carried out by electronic circuits, for example micro-wired, which do not involve a computer program.

The control device 106 comprises a memory, such as the memory 124, in which data defining in particular thresholds n1, n2 for the rotational speed $N_{GG}$ of the compressor shaft 112 are stored. These data will be described in more detail later.

Figure 2:
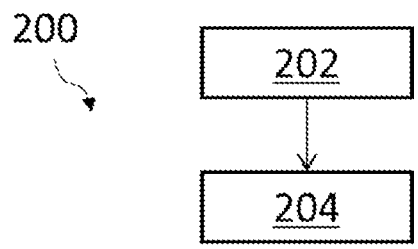
FIG. 2 is a block diagram of an example of a method for determining ignition thresholds for the rotational speed according to the disclosure.

FIG. 2 illustrates an example of a method 200, according to the disclosure, for determining thresholds n1, n2 for the rotational speed $N_{GG}$ of the compressor shaft 112. This method 200 is implemented, for example, when designing the gas turbine 102.

Indeed, the capacity of the combustion chamber 110 to burn the fuel introduced is expressed by an aerodynamic load Ω which depends on the atmospheric environment in which the gas turbine 102 is supposed to operate (this atmospheric environment being characterised, for example, by a pressure P0 and/or a temperature T0 outside the gas turbine 102) and on the rotational speed of the compressor shaft 112. The aerodynamic load Ω can thus be used to assess the performance of the combustion chamber 110.

The curve of the aerodynamic load Ω depends on the architecture of the gas turbine 102 under consideration, which defines, among other things, the residence time of the gases in the combustion chamber 110 and the speed of the combustion reactions. In other words, the curve of the aerodynamic load Ω is specific to each gas turbine model.

For example, the aerodynamic load Ω considered is equivalent to the combustion chamber loading given in Gas Turbine Performance, Walsh, P. P. and Fletcher, P., Blackwell Science, Oxford (1998). For example, the aerodynamic load Ω is given by the following equation:

$$\Omega = \frac{W_{32}}{VOL \cdot P_{32}^{1.8} \cdot 10^{0.00145 \cdot T_{32}}} \qquad \text{[Math. 1]}$$

where VOL is the volume of the combustion chamber 110, $P_{32}$ and $T_{32}$ are the pressure and temperature, respectively, at which the gases enter the combustion chamber 110, and $W_{32}$ is the mass flow rate at which the gases enter the combustion chamber 110.

The volume VOL of the combustion chamber 110 is a design parameter of the gas turbine 102, while the pressure $P_{32}$, the temperature $T_{32}$ and the flow rate $W_{32}$ depend on the design of the gas turbine 102, but also on its atmospheric environment and on the rotational speed $N_{GG}$ of the compressor shaft 112.

In this example, the International Standard Atmosphere (ISA) is used to define the atmospheric environment. This ISA standard associates a predefined temperature and pressure with each altitude. Thus, in the example described, the atmospheric environment is completely defined by the altitude H. Thus, the aerodynamic load Ω is a function of the altitude H and of the rotational speed $N_{GG}$ of the compressor shaft 112.

Alternatively, the aerodynamic load Ω is also defined as a function of a deviation between the temperature ISA at this altitude H and the outside temperature T0 measured. Thus, in this alternative, the aerodynamic load Ω is a function of the altitude H, the deviation from the temperature ISA at that altitude H and the rotational speed $N_{GG}$ of the compressor shaft 112.

Figure 5:
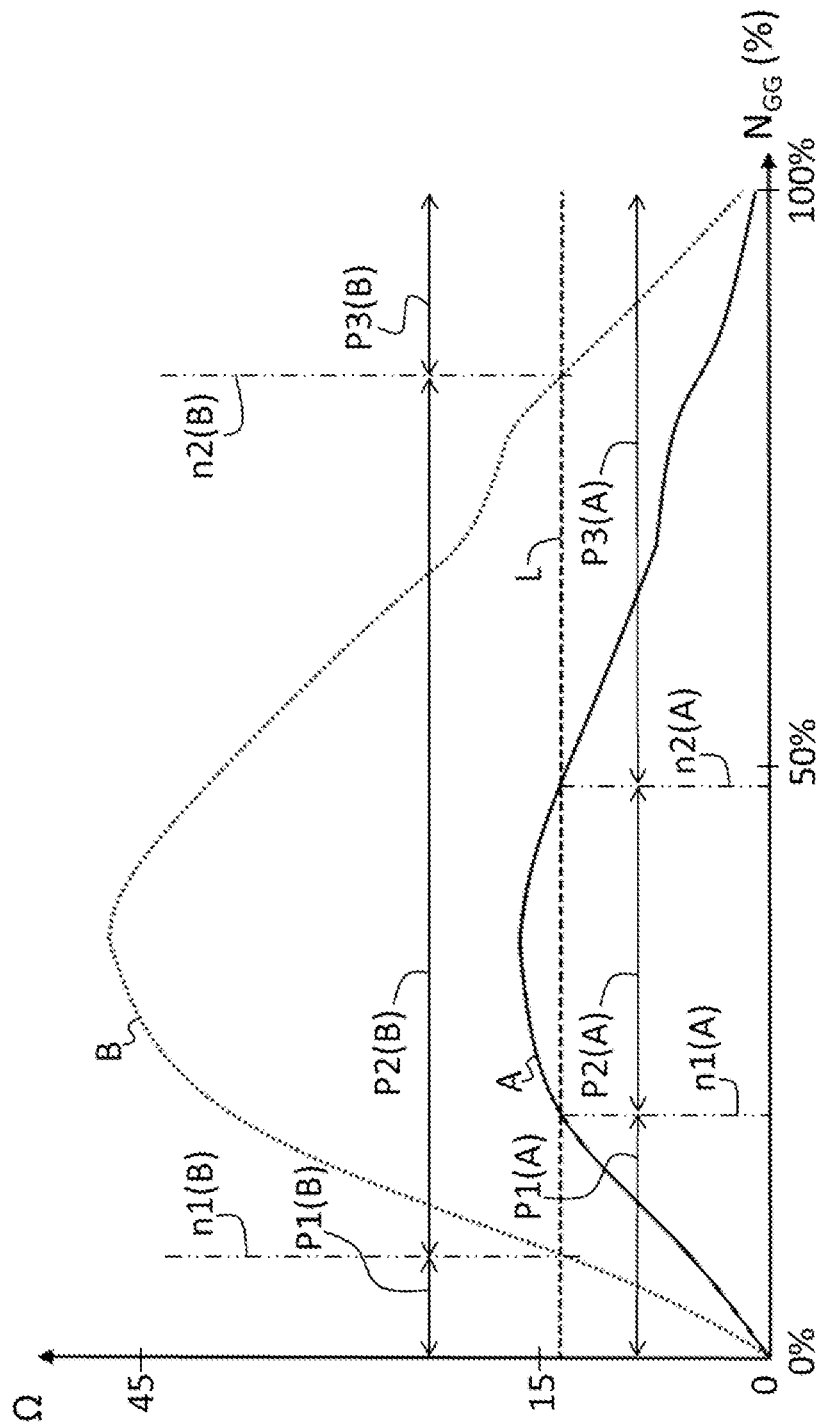
FIG. 5 is a diagram showing the evolution of an aerodynamic load parameter as a function of the rotational speed of a compressor shaft of the propulsion system according to the disclosure.

FIG. 5 shows two curves A, B of the aerodynamic load Ω of the combustion chamber 110 as a function of the rotational speed $N_{GG}$ of the compressor shaft 112, for respectively two atmospheric environments defined by the ISA standard: the first when the altitude H is zero, i.e. at sea level (SLS for "Sea Level Static"), and the second when the altitude H is above sea level, for example at an altitude of 6,000 m. The rotational speed $N_{GG}$ is expressed as a percentage of the nominal speed of the gas generator 104. This nominal speed is generally a high regime speed of the compressor shaft 112 taken as a reference.

As can be seen in FIG. 5, the aerodynamic load curves A, B are "bell-shaped", i.e. for each, the aerodynamic load Ω is zero when the rotational speed $N_{GG}$ is zero, then increases with the rotational speed $N_{GG}$, reaches a maximum, then decreases with the rotational speed $N_{GG}$ to tend towards zero when the rotational speed $N_{GG}$ is high, i.e. approaches the nominal speed.

It has been determined that the combustion chamber 110 can only be ignited when the aerodynamic load Ω is below a certain ignition limit L. This limit depends on the aerodynamic load and on the air flow rate $W_{32}$ entering the combustion chamber 110, the air flow rate being reducible to the rotational speed $N_{GG}$ of the compressor shaft 112.

Because of their bell shape, each of the A and B curves rises above the ignition limit L at a first threshold n1, then falls below it again at a second threshold n2. Between these two thresholds n1, n2, the curve remains above the ignition limit L, indicating that the combustion chamber 110 cannot be ignited. On the other hand, the combustion chamber 110 can be ignited at a rotational speed $N_{GG}$ of the compressor shaft 112 lower than the threshold n1 or higher than the threshold n2.

Thus, the gas turbine 102 is designed to allow the ignition of the combustion chamber 110 over each of the ranges P1=(approximately 0%, n1) and P3=(n2, 100%). In contrast, the gas turbine 102 is designed so that the ignition is not possible in the P2 range (n1, n2). The threshold n1 marks an upper bound of the first ignition range P1=(about 0%, n1), while the threshold n2 marks a lower bound of the second ignition range P3=(n2, 100%).

FIG. 5 also shows that these thresholds n1, n2 can vary depending on the atmospheric environment of the gas turbine 102. The comparison of the curve A with the curve B shows that the threshold n1 decreases with the altitude H so that n1(A)>n1(B) and the threshold n2 increases with the altitude so that n2(A)<n2(B). In other words, the range P2=(n1, n2) over which the ignition of the combustion chamber 110 is not possible, is greater at altitude than at sea level.

It has also been determined that, for a deviation from the temperature ISA at the altitude H in question, the range P2 (n1, n2) over which the ignition is not possible is wider with a temperature lower than the temperature ISA at this altitude.

The threshold n1 is generally at most 30% of the nominal speed, while the threshold n2 is generally at least 40% of the nominal speed, and more particularly generally at least 50% of the nominal speed.

Thus, in a step 202, for at least one atmospheric environment in which the gas turbine 102 is supposed to operate, the thresholds n1 and n2 are determined, for example by numerical simulation of the gas turbine 102, or by testing the latter.

For example, for each atmospheric environment, a progressively higher flow rate of air is sent by a dedicated apparatus into the combustion chamber 110 (the compressor is not used and can be detached from the combustion chamber 110), while attempts are carried out to ignite the combustion chamber 110. This shows the air flow rate ranges where the ignition is possible. The relationship between the rotational speed $N_{GG}$ of the compressor shaft 112 which will be used to obtain each air flow rate value is known, which allows to deduce the ranges P1, P2, P3 and therefore the thresholds n1, n2 from the air flow rate ranges.

Alternatively, in this step 202, the aerodynamic load curve Ω is determined, for example by simulation or testing as before, and compared with the predetermined ignition limit L, to determine the thresholds n1, n2.

Preferably, the thresholds n1 and n2 are determined for several atmospheric environments.

In a step 204, the thresholds n1 and n2 are stored in the memory 124 of the control device 106, in association with the atmospheric environment for which they were determined.

For example, a table is stored in the control device 106, this table indicating for each of several altitudes H, the associated thresholds n1 and n2:

TABLE 1

| External atmospheric conditions | first threshold n1 | second threshold n2 |
|---|---|---|
| ISA, altitude H = 0 | n1(A) | n2(A) |
| ISA, altitude H = a value greater than 0 | n1(B) | n2(B) |

If the deviation between the temperature ISA and the measured outside temperature T0 is taken into account, the table can indicate the thresholds n1 and n2 for several altitudes H and each time for several deviations from the temperature ISA at the altitude H in question.

In this way, the control device 106 knows, for several altitudes H and, if necessary, for several deviations from the temperature ISA, the rotation speed ranges $N_{GG}$ over which the combustion chamber 110 is able or unable to ignite.

Alternatively, the table could be replaced by a function relating the thresholds n1, n2 to the atmospheric environment parameter or parameters (the altitude H or the altitude H and the deviation of the temperature ISA in the example described).

Figure 3:
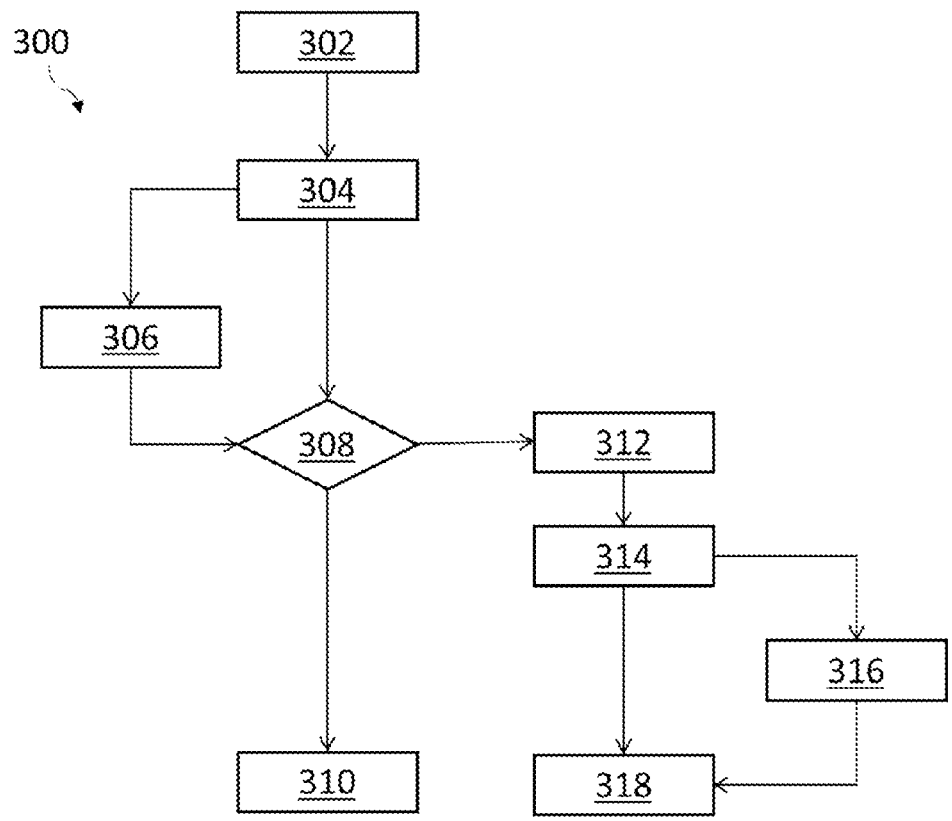
FIG. 3 is a block diagram of a first example of a start-up method according to the disclosure.
Figure 6:
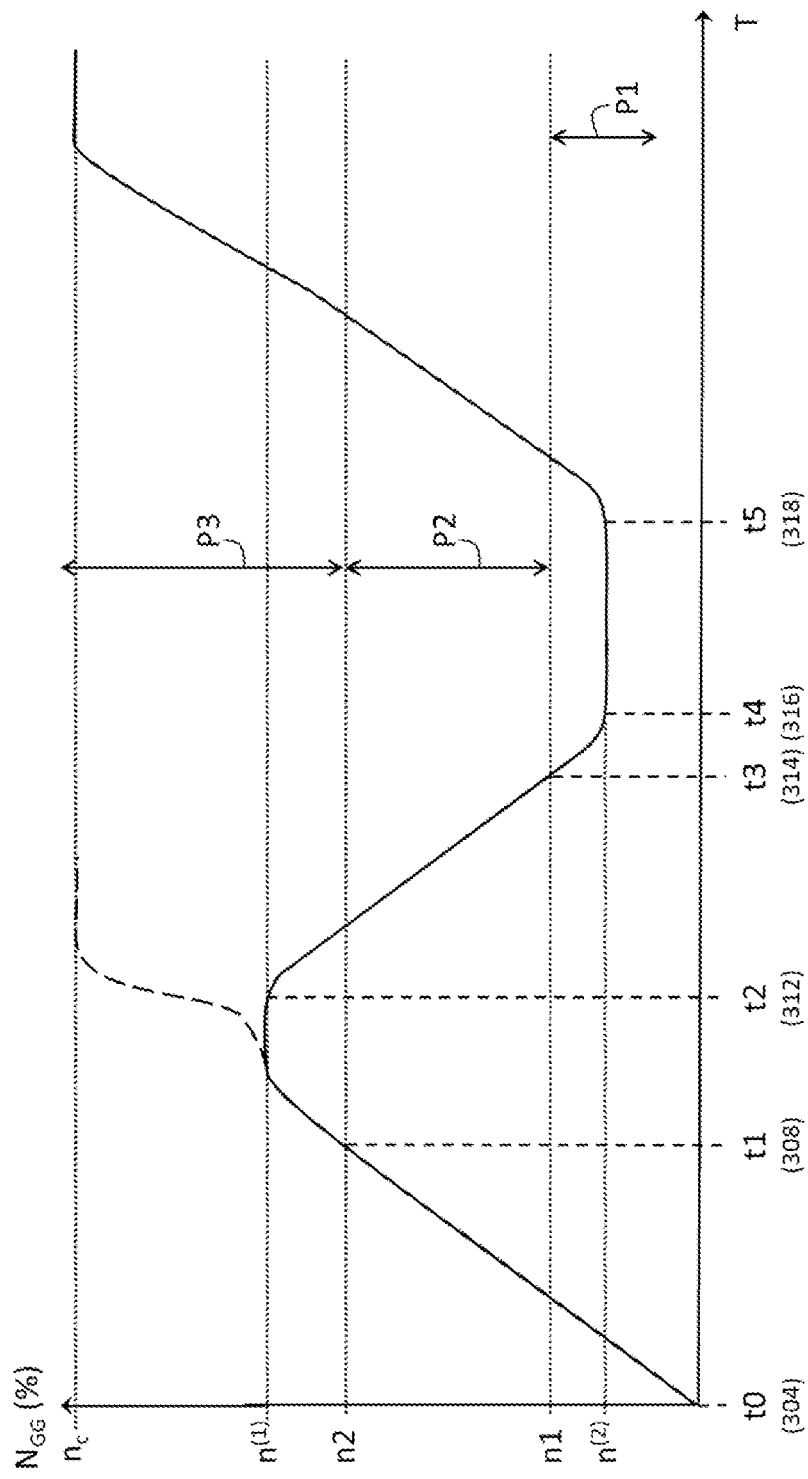
FIG. 6 is a diagram showing the start-up phases of a gas turbine on an aircraft equipped with the system according to the disclosure.

FIGS. 3 and 6 illustrate a first example of a method 300 for starting the gas turbine 102. In this example, the gas turbine 102 is initially assumed to be at a standstill, with the combustion chamber 110 switched off.

In a step 302, the control device 106 obtains the thresholds n1 and n2. For example, the measurement system 120 measures the atmospheric environment parameter or parameters of the gas turbine 102. In the example described, the altitude H is measured, as well as, if necessary, the outside temperature T0 to find out the deviation from the temperature ISA at the altitude H. The control device 106 then determines the thresholds n1, n2 on the basis of the environmental parameter or parameters measured. In the example described, the thresholds n1 and n2 associated with the external atmospheric conditions measured are retrieved from the table recorded.

At a step 304 (time t0 in FIG. 6), the control device 106 activates the electric starter 114 so that the latter provides a drive torque to the compressor shaft 112 and accelerates the latter, for example with a constant acceleration.

In a step 306, the control device 106 controls the injector 116 to inject the fuel into the combustion chamber 110. This step can be carried out, for example, from the moment when 90% of the value of the threshold n2 is reached. At the same time, the control device 106 can control the ignition device 108 to activate so that it is ready to operate as soon as the threshold n2 is crossed.

At a step 308 (time t1 in FIG. 6), the control device 106 detects that the rotational speed $N_{GG}$ of the compressor shaft 112 crosses the threshold n2 and, in response, controls the ignition device 108 to attempt the ignition of the combustion chamber 110. Several ignition attempts can be carried out. Meanwhile, the rotational speed $N_{GG}$ of the compressor shaft 112 increases to a maximum rotational speed $n^{(1)}$ at which the electric starter 114 alone can drive the compressor shaft 112. This will hereafter be referred to as the maximum assistance speed $n^{(1)}$.

If ignition is successful, the gas generator 104 starts up at a step 310 and the turbine 111 drives the compressor shaft 112 so that its rotational speed $N_{GG}$ increases until it reaches a rotational speed $n_c$ referred to as the end of start-up set point (dotted curve segment in FIG. 6).

Once the gas generator 104 has started, the assistance from the electric starter 114 is no longer necessary. The control device 106 can then deactivate the electric starter 114 to stop providing a torque to the compressor shaft 112 or, alternatively, continue to assist the compressor shaft 112 until a speed referred to as cut-off speed is reached, from which the turbine 111 alone ensures the rotation of the compressor shaft 112, the cut-off speed being lower than the end-of-starting set point speed.

If ignition of the combustion chamber 110 fails in step 308, for example if the control device 106 detects that the rotational speed $N_{GG}$ remains at the maximum assistance speed $n^{(1)}$ for a certain predefined time without ignition of the combustion chamber 110, the control device 106 preferably implements a second chance start-up at low speed, in the first ignition range P1. This improves your chances of getting started.

To do this, at a step 312 (time t2 in FIG. 6), the control device 106 controls the electric starter 114 to stop driving the compressor shaft 112, so that the rotational speed $N_{GG}$ decreases to the first ignition range P1. For example, the control device 106 controls the electric starter 114 in generator mode to take torque from the compressor shaft 112 and thus decelerate the latter. Using the electric starter 114 allows a rapid deceleration. Alternatively, the deceleration can be free, i.e. the control device 106 can deactivate the electric starter 114 so that the latter does not act on the compressor shaft 112.

At a step 314 (time t3 in FIG. 6), the control device 106 detects that the rotational speed $N_{GG}$ crosses the threshold n1 and, in response, controls the ignition device 108 to attempt the ignition of the combustion chamber 110 in the first ignition range P1.

At a step 316 (time t4 in FIG. 6), the control device 106 controls the electric starter 114 to stabilise the rotational speed $N_{GG}$ of the compressor shaft 112 at a speed $n^{(2)}$ comprised within the first ignition range P1 in order to allow further ignition attempts if the ignition has not been successful at step 314 or to maintain the flame in the combustion chamber 110 if the ignition has been successful at step 314.

At a step 318 (time t5 in FIG. 6), while the combustion chamber 110 is ignited, the control device 106 can continue to control the electric starter 114 to continue assisting the compressor shaft 112 until the cut-off speed is reached at which the turbine 111 alone ensures the rotation of the compressor shaft 112. The control device 106 deactivates the electric starter 114, for example, in response to detection of this cut-off speed. The turbine 111 then continues to accelerate the compressor shaft to the set point speed $n_c$ at the end of start-up.

Figure 4:
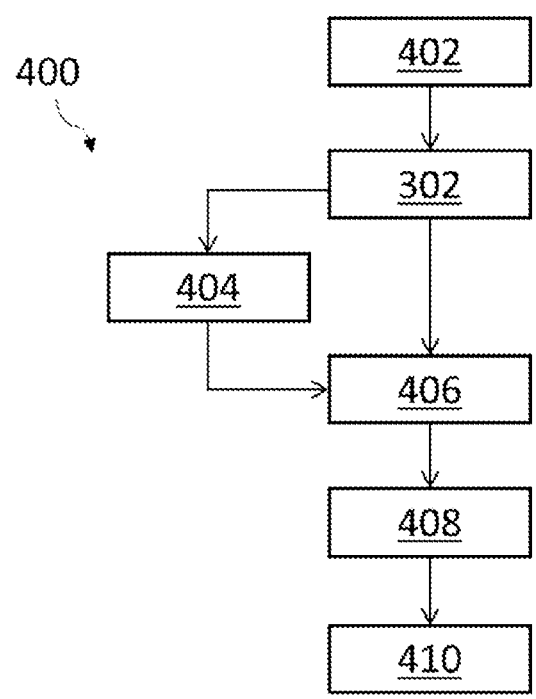
FIG. 4 is a block diagram of a second example of a start-up method according to the disclosure, in the case of a prior shutdown of the gas turbine.
Figure 7:
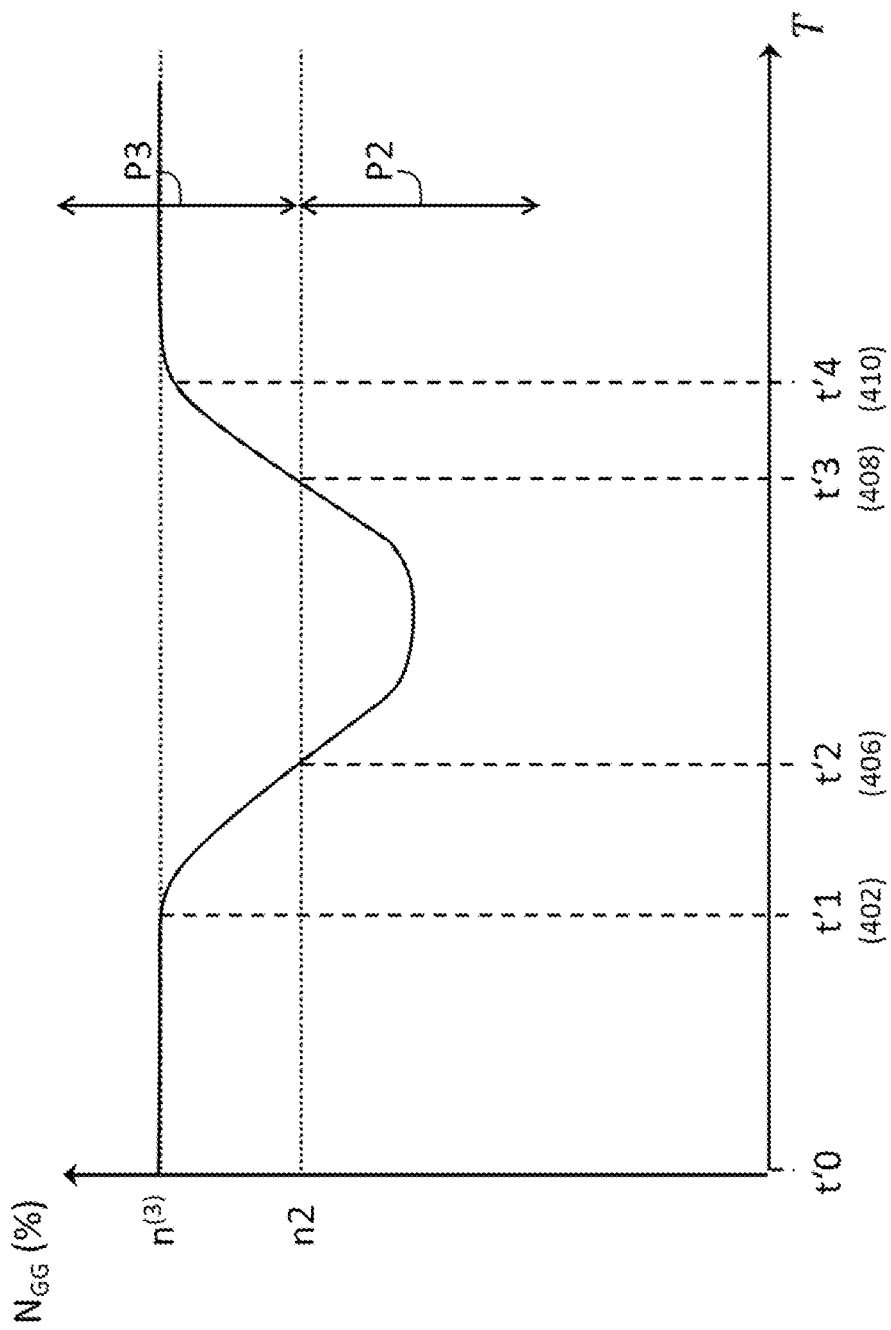
FIG. 7 is a diagram representing the start-up phases of a gas turbine on an aircraft equipped with the system according to the disclosure, in the case of a prior shutdown of the gas turbine.

With reference to FIGS. 4 and 7, a second example of the method 400 for starting the gas turbine 102 will now be described. In this second example, the start-up follows an undesired shutdown of the combustion chamber 110 at high regime.

In such a case, at the time of switch-off, the rotational speed $N_{GG}$ of the compressor shaft 112 is generally high and is located, for example (as shown in FIG. 7), in the second ignition range P3, above the threshold n2.

Thus, at a step 402 (time t'1 in FIG. 7), the combustion chamber 110 is extinguished and the rotational speed $N_{GG}$ of the compressor shaft 112 begins to decrease.

This deceleration is free, for example, i.e. the electric starter 114 is inactive.

The method 400 then comprises the step 302 described above for obtaining the threshold n2. For example, the threshold n2 is obtained from the environmental parameter or parameters measured, and more specifically the altitude H or the altitude H and the deviation of the temperature ISA in the example described.

In an optional step 404, the control device 106 controls the ignition device 108 to attempt to reignite the combustion chamber 110 at least once before reaching the threshold n2.

At a step 406 (time t2 in FIG. 7), the threshold n2 is crossed and the combustion chamber 110 is no longer able to ignite. The control device 106 detects this and in response activates the electric starter 114 to provide torque to the compressor shaft 112. This allows to limit the drop in the rotational speed $N_{GG}$ of the compressor shaft 112, then to increase this rotational speed $N_{GG}$ to reach the second ignition range P3.

At a step 408 (time t3 in FIG. 7), the rotational speed $N_{GG}$ of the compressor shaft 112 crosses the threshold n2, which the control device 106 detects to control, in response, the ignition device 108 to attempt the ignition of the combustion chamber 110 as quickly as possible after the threshold n2 is crossed.

At a step 410 (time t4 in FIG. 7), following the ignition of the combustion chamber 110, the control device 106 detects that the gas generator 104 is autonomous. The assistance from the electric starter 114 is then no longer required and the control device 106 deactivates the electric starter 114.

This allows the combustion chamber 110 to be reignited quickly after it has been switched off. This saves time in restarting the gas turbine 102, compared with the case where the rotational speed $N_{GG}$ of the compressor shaft 112 would have to be reduced to the first ignition range P1 in order to carry out the restart.

In some embodiments, the control device 106 may previously check the amount of energy available in the electrical storage device 118, for example during a scheduled shutdown of the gas turbine 102. In the event that the available energy is insufficient to allow a high-speed start-up (i.e. in the second ignition range P3) as described above, the control device 106 may control the recharging of the electrical storage device 118, for example from an on-board generator (not shown) designed to generate the electrical energy on board an aircraft, prior to the shutdown of the gas turbine 102. In this way, the electrical storage device 118 is able to supply the electric starter 114 for a future start-up (normal or following an unexpected shutdown).

It is clear that an aircraft propulsion system of the type described above allow to reduce the start-up time by eliminating the need for a stabilisation phase of the rotational speed $N_{GG}$ to allow various ignition equipment to be activated.

The propulsion system described above also has the advantage of improving the chances of starting the gas turbine by allowing the ignition of the combustion chamber over a low speed range after a failed ignition attempt over a high speed range.

Another advantage is that the combustion chamber can be reignited quickly after being switched off, when the rotational speed is still close to or within the high-speed range. This allows to save time when it comes to restarting the gas turbine.

Another advantage is that it allows to improve start-up reliability and reproducibility. This eliminates operability problems such as the risk of over-temperature, which can affect the service life of the hot portions of the engine. The risks of over-temperature can be linked, among other things, to a build-up of fuel in the combustion chamber before successful ignition. In the context of the disclosure, the air flow rate is high when the ignition is attempted, allowing a rapid evacuation of the fuel from the combustion chamber where it does not have time to accumulate.

It will be further noted that the disclosure is not limited to the embodiments described above. Indeed, it will be apparent to the person skilled in the art that various modifications can be made to the above-described embodiments, in the light of the teaching just disclosed.

For example, the thresholds used could be constant, and therefore not dependent on the atmospheric environment of the gas turbine. In particular, the control device would use a single threshold value n1 and a single threshold value n2. For example, these values would be taken in the worst case, for example at a maximum altitude that the aircraft is designed to reach. These constant thresholds could therefore be used in all situations, in particular for starting from a standstill or restarting following an accidental shutdown of the combustion chamber in mid-flight.

In the detailed presentation of the disclosure given above, the terms used should not be interpreted as limiting the disclosure to the embodiments set out in the present description but should be interpreted to include all equivalents the anticipation of which is within the reach of the person skilled in the art by applying his general knowledge to the implementation of the instruction just disclosed.

The invention claimed is:

1. A propulsion system for an aircraft comprising:
    a gas turbine comprising: a combustion chamber, an ignition device configured to ignite the combustion chamber, a compressor configured to supply air to the combustion chamber, the compressor being equipped with a compressor shaft, and an electric starter configured to drive the compressor shaft, the gas turbine being configured so that the combustion chamber is ignited by the ignition device in a first ignition range (P1) of rotational speeds of the compressor shaft;
    a start-up control device designed to: with the combustion chamber switched off, control the electric starter to accelerate the compressor shaft, and with the compressor shaft accelerated, control the ignition device to attempt an ignition of the combustion chamber;
    wherein the combustion chamber is further configured to be ignited by the ignition device in a second ignition range (P3) of rotational speeds of the compressor shaft, which is greater than the first ignition range (P1), but not in a third rotational speed range (P2) between the first ignition range (P1) and the second ignition range (P3), the control device being designed, when the compressor shaft is accelerated, to accelerate the latter up to the second ignition range (P3) in order to attempt to ignite the combustion chamber in the latter.

2. The propulsion system according to claim 1, wherein the second ignition range (P3) has a lower bound (n2) equal to at least 40% of a nominal rotational speed of the compressor shaft.

3. The propulsion system according to claim 2, wherein the first ignition range (P1) has an upper bound (n1) of at most 30% of the nominal rotational speed of the compressor shaft.

4. The propulsion system according to claim 1, wherein the control device is designed, in the event of failure of the ignition attempt in the second ignition range (P3):
to decelerate the compressor shaft until it reaches the first ignition range (P1); and
with the rotational speed (NGG) in the first range (P1), to control the ignition device to attempt an ignition of the combustion chamber.

5. The propulsion system according to claim 1, wherein the control device is arranged to control the electric starter and the ignition device in response to an extinction of the combustion chamber and to a detection that the rotational speed (NGG) falls below the second ignition range (P3).

6. The propulsion system according to claim 1, wherein the control device is configured to determine a lower bound (n2) of the second ignition range (P3) on a basis of at least one measured parameter of an atmospheric environment of the gas turbine.

7. An aircraft comprising the propulsion system according to claim 1.

8. A method for starting up a gas turbine of an aircraft, the gas turbine comprising: a combustion chamber, an ignition device configured to ignite the combustion chamber, a compressor configured to supply air to the combustion chamber, the compressor being equipped with a compressor shaft, and an electric starter configured to drive the compressor shaft, the qasr turbine being configured so that the combustion chamber is ignited by the ignition device in a first ignition range (P1) of rotational speeds of the compressor shaft; a start-up control device designed to: with the combustion chamber switched off, control the electric starter to accelerate the compressor shaft, and with the compressor shaft accelerated, control the ignition device to attempt an ignition of the combustion chamber, wherein the combustion chamber is further configured to be ignited by the ignition device in a second ignition range (P3) of rotational speeds of the compressor shaft, which is greater than the first ignition range (P1), but not in a third rotational speed range (P2) between the first ignition range (P1) and the second ignition range (P3), the control device being designed, when the compressor shaft is accelerated, to accelerate the latter up to the second ignition range (P3) in order to attempt to ignite the combustion chamber in the latter, the method comprising: while the combustion chamber of the gas turbine is switched off, controlling the electric starter of the gas turbine to accelerate the compressor shaft to drive the compressor configured to supply the air to the combustion chamber; and with the compressor shaft accelerated, controlling the ignition device of the gas turbine to attempt an ignition of the combustion chamber, and accelerating the compressor shaft to the second ignition range (P3) in order to attempt to ignite the combustion chamber.

9. The method according to claim 8, wherein a lower bound (n2) of the second ignition range (P3) is previously determined by testing the gas turbine or by simulating the gas turbine.

10. A computer program downloadable from a communications network and/or recorded on a computer-readable medium, the program comprising instruction for executing the method according to claim 9 when the computer program is executed on a computer.

11. A propulsion system for an aircraft comprising:
a gas turbine comprising: a combustion chamber, an ignition device configured to ignite the combustion chamber, a compressor configured to supply air to the combustion chamber, the compressor being equipped with a compressor shaft, and an electric starter configured to drive the compressor shaft, the gas turbine being configured so that the combustion chamber is ignited by the ignition device in a first ignition range (P1) of rotational speeds of the compressor shaft;
a start-up control device designed to: with the combustion chamber switched off, control the electric starter to accelerate the compressor shaft, and with the compressor shaft accelerated, control the ignition device to attempt an ignition of the combustion chamber;
wherein the combustion chamber is further configured to be ignited by the ignition device in a second ignition range (P3) of rotational speeds of the compressor shaft, which is greater than the first ignition range (P1), but not between the ignition ranges (P1, P3), the second ignition range (P3) having a lower bound (n2) equal to at least 40% of a nominal rotational speed of the compressor shaft, the control device being designed, when the compressor shaft is accelerated, to accelerate the latter up to the second ignition range (P3) in order to attempt to ignite the combustion chamber in the latter.

12. The propulsion system according to claim 11, wherein the first ignition range (P1) has an upper bound (n1) of at most 30% of the nominal rotational speed of the compressor shaft.

* * * * *